United States Patent [19]

Herbon

[11] Patent Number: 5,477,754
[45] Date of Patent: Dec. 26, 1995

[54] METAL CUTTING INSERTS AND METHOD OF MAKING

[75] Inventor: Jeffrey R. Herbon, Dryden, Mich.

[73] Assignee: Carboloy Inc., Warren, Mich.

[21] Appl. No.: 113,101

[22] Filed: Aug. 30, 1993

[51] Int. Cl.⁶ .................................. B22F 5/00; B23L 5/20
[52] U.S. Cl. ...................... 76/101.1; 76/DIG. 6; 407/113
[58] Field of Search ................................ 76/101.1, 104.1, 76/115, 108.2, DIG. 6, DIG. 11, DIG. 12; 407/119, 113, 114

[56] References Cited

U.S. PATENT DOCUMENTS 4,966,501 10/1990 Nomura et al. ........................ 407/119
5,365,805 11/1994 Pantzar et al. ............................ 76/115

*Primary Examiner*—Douglas D. Watts
*Attorney, Agent, or Firm*—Burns, Doane, Swecker & Mathis

[57] ABSTRACT

A metal cutting insert is made by sintering an insert body and coating the sintered insert body with a conventional coating. Subsequently, a supporting surface of the insert is ground smooth while removing the coating therefrom. The supporting surface of the insert is thereby formed by an uncoated, smoothly ground surface of the sintered body.

9 Claims, 2 Drawing Sheets

METAL CUTTING INSERTS AND METHOD OF MAKING

BACKGROUND OF THE INVENTION

The present invention relates to metal cutting inserts and to a method of making such inserts.

A prior art diamond-shaped cutting insert 8, which, for example, can be of the type used for metal turning operations is depicted in FIGS. 1 and 3. That insert comprises a sintered insert body 10 coated with a coating C such as an aluminum oxide coating. The insert 8 includes first and second oppositely situated main faces 12, 14 which are interconnected by side faces 16 as depicted in FIG. 3. The first main face 12 includes four cutting edges 18 and a chip breaking groove 20 associated with each cutting edge. A center hole 21 extends through the insert for receiving a fastener (not shown) to connect the insert to a seating surface (e.g., a shim surface) of a holder. The second main face 14 includes an annular supporting surface 22 which surrounds a central groove 23, the groove 23 surrounding the center hole 21. The supporting surface 22 is adapted to rest upon the seating surface of the holder. The supporting surface should seat in a flat and flush condition upon the seating surface in order to ensure that the cutting edge will not wobble during a cutting operation, and so that the area of surface contact is great enough to conduct heat from the insert at a sufficiently high rate to avoid damage to the insert.

A typical method of making such a metal cutting insert includes forming the insert body 10' by sintering a powderous hard material such as tungsten carbide. The sintering operation produces the insert body 10' having main faces 12', 14', side faces 16', cutting edges 18', chip breaking grooves 20', and a supporting surface disposed on the main face 14'. The supporting surface produced directly by the sintering step is not sufficiently smooth to achieve the optimum flat and flush seating of the insert on the holder seating surface discussed above. Therefore, it has been the practice to subject the sintered supporting surface to a grinding operation (prior to the coating step) in order to produce the smooth supporting surface 22'G depicted in FIG. 2. (Note: the suffix "G" as used herein denotes a surface which has been ground, whereas the suffix "UG" denotes an unground surface.)

Subsequent to the grinding of the supporting surface 22'G, the insert body 10' is coated with the coating C in order to impart desired conventional characteristics to the cutting edges 18 of the insert. Typically, the coating is applied by a conventional vapor deposition process such as a conventional chemical vapor deposition (CVD) process or a conventional physical vapor deposition (PVD) process or a combination of both.

Inserts made according to the above-described method have functioned adequately when used in non-precision cutting operations, but not as well in connection with precision cutting operations. The reason for this is that the vapor deposition process may produce so-called adhesions. Adhesions are small coating particles (surface bumps) which, when located on the supporting surface 22, may be large enough to disrupt the seating of the insert on the seating surface. That is, the insert may not seat flat and flush against the seating surface, whereby the insert may tend to wobble during the cutting operation, and also the area of surface contact is reduced. Insert wobbling will adversely affect the cutting accuracy, which is unacceptable for high precision cutting operations. The reduced surface contact will slow the rate of heat conduction, thereby trapping more heat in the insert, whereupon an accelerated breakdown and/or wearing of the insert may occur.

It would, therefore, be desirable to provide methods for producing novel metal cutting inserts which avoid those shortcomings.

SUMMARY OF THE INVENTION

The present invention involves a method of making a metal cutting insert which involves forming an insert body having first and second main faces disposed opposite one another and interconnected by a side face. The first main face includes a cutting edge. The second main face includes a supporting surface for supporting the insert on a seating surface. The insert is coated such that at least the cutting edge and the supporting surface are provided with a coating. Thereafter, the supporting surface is ground smooth so as to simultaneously remove the coating therefrom, whereby the supporting surface of the insert is defined by a smoothly ground surface of the insert body.

It is possible within the scope of the invention to pregrind the supporting surface prior to the coating step, it being understood that thereafter the supporting surface would again be ground during the step which removes the coating therefrom.

The insert can be of the single sided type in which a cutting edge is located on only one of the main faces. Alternatively, the insert could be of the double-sided type which has a cutting edge on each of the main faces. In the double-sided type, there is provided a supporting surface on each of the main faces, and each of those supporting surfaces would be subjected to the above-described grinding step which removes the coating therefrom.

The present invention also involves a metal cutting insert which comprises an insert body formed of a sintered hard material. The insert body includes first and second main faces interconnected by a side face. The first main face includes a cutting edge having a vapor deposition-applied coating thereon. The second main face includes a supporting surface for supporting the insert on a seating surface. The supporting surface is uncoated and ground smooth.

The insert can be of the single sided type or the double-sided type. In the latter case, the second main face includes a coated cutting edge, and the first main face includes a supporting surface which is uncoated and ground smooth.

BRIEF DESCRIPTION OF THE DRAWINGS

The objects and advantages of the invention will become apparent from the following detailed description of preferred embodiments thereof in connection with the accompanying drawings in which like numerals designate like elements and in which:

FIGS. 4–6 depict three steps involved in the forming of an insert according to a first preferred embodiment of the present invention wherein:

FIG. 4 is a view similar to FIG. 2 of an insert body which constitutes an intermediate element resulting from a first step in the fabrication of an insert according to the first preferred embodiment;

FIG. 5 is a view similar to FIG. 3 of an intermediate element resulting from a second step in the fabrication of an insert according to the first preferred embodiment;

FIG. 6 is a view of FIG. 5 after a supporting surface has been ground, in order to form a final cutting insert according to the first preferred embodiment;

FIGS. 7, 8 and 9 show steps in the fabrication of an insert according to the second preferred embodiment of the invention wherein:

FIG. 7 is a view similar to FIG. 4 of the intermediate element following a first step in the fabrication of an insert according to the second preferred embodiment;

FIG. 8 is a view similar to FIG. 5 of the intermediate element following a second step in the fabrication of an insert according to the second preferred embodiment; and FIG. 9 is a view similar to FIG. 6 of the final insert according to the second preferred embodiment.

DETAILED DESCRIPTION OF PREFERRED EMBODIMENTS OF THE INVENTION

Figure 1:
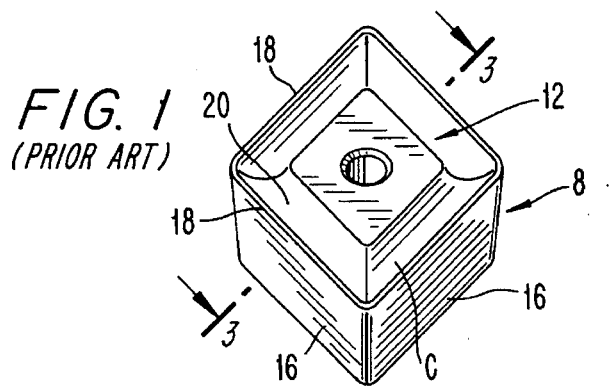
FIG. 1 is a perspective view of a conventional coated metal cutting insert.
Figure 2:
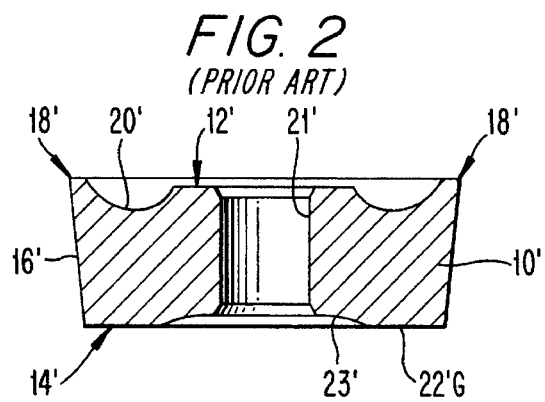
FIG. 2 is a cross-section taken through a sintered insert body which constitutes an intermediate element in the fabrication of the insert depicted in FIG. 1.
Figure 3:
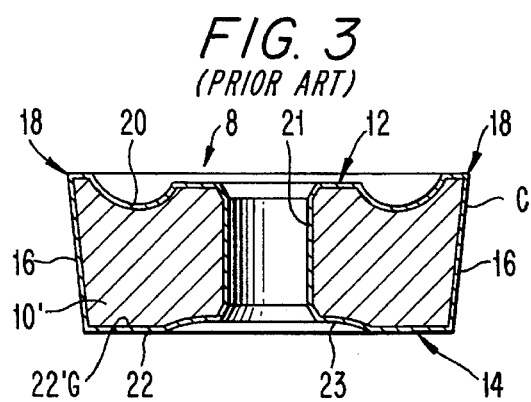
FIG. 3 is a sectional view taken along the line 3—3 in FIG. 1.
Figure 4:
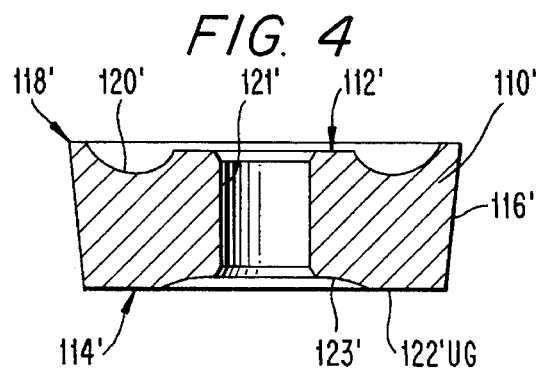
Figure 5:
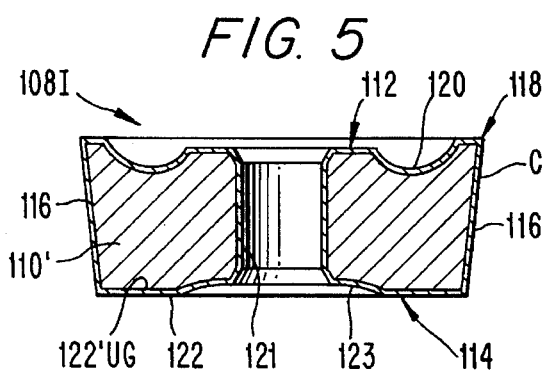
Figure 6:
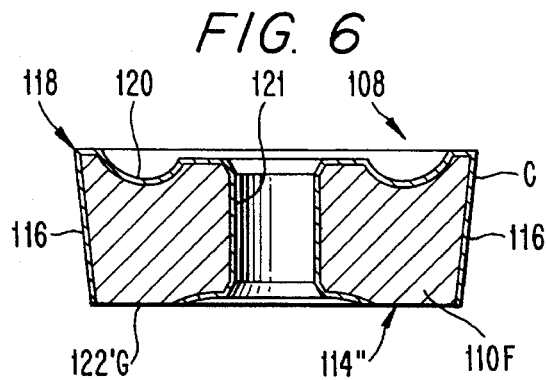

A metal cutting insert 108 produced according to a first preferred embodiment of the present invention is depicted in FIG. 6. That insert has the same physical appearance as the insert 8 disclosed earlier in connection with FIGS. 1 and 3, except that the supporting surface 122'G is uncoated. Steps involved in making that insert 108 are apparent from FIGS. 4 and 5. FIG. 4 depicts an insert body 110' formed by a conventional sintering process employing a powder of hard material, such as tungsten carbide. The insert body 110' is the same as the prior art insert body depicted in FIG. 2, except that the supporting surface 122'UG remains unground prior to coating (hence, the suffix "UG"). That is, the sintered insert body 110' includes first and second main faces 112', 114' interconnected by side faces 116', cutting edges 118', chip breaking grooves 120', and a center hole 121'. The second face 114' includes the unground supporting surface 122'UG which surrounds a center recess 123'. That recess 123' surrounds the center hole 121'.

The uncoated insert body 110' is then subjected to a conventional vapor deposition process such as a chemical (CVD) or physical (PVD) vapor deposition process or a combination of both, to produce the coated body 108I depicted in FIG. 5 which constitutes an intermediate element in the insert-making method. The coating (e.g., a coating of $Al_2O_3$) thus presents first and second main faces 112, 114 interconnected by side surfaces 116, cutting edges 118, chip breaking grooves 120, and a center hole 121. The second main face 114 forms an annular supporting surface 122 which surrounds a central recess 123. The recess 123 surrounds the hole 121.

The intermediate element 108I is then subjected to a grinding step wherein the second main face of the body is ground smooth, with the coating being simultaneously removed therefrom, to produce the final cutting insert 108 depicted in FIG. 6. Thus, that final insert 108 presents coated cutting edges 118 and coated chip breaking grooves and a smoothly ground, uncoated supporting surface 122'G. This ensures that the supporting surface will be free of adhesions (projecting bumps) which could prevent the insert from sitting flat on the seating surface of a tool holder or shim seat. Consequently, the insert will have less tendency to wobble during a cutting operation, so the cutting edge will be better located throughout the cutting operation. Also with the smoother finish, a larger amount of surface area contact will occur between the supporting surface and the seating surface for dissipating heat from the insert at a suitable rate to help prevent overheating of the insert. In fact, since the material of the body 110' (e.g., tungsten carbide) possesses a higher coefficient of thermal conduction than the combined thermal resistance of body and coating, the rate of heat dissipation will be incrementally greater than that of the prior art insert depicted in FIG. 3, even if the coating of the latter were to present a perfectly smooth supporting surface.

Figure 7:
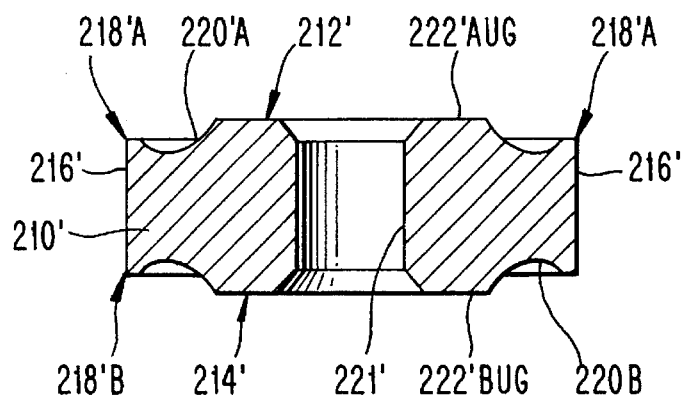
Figure 8:
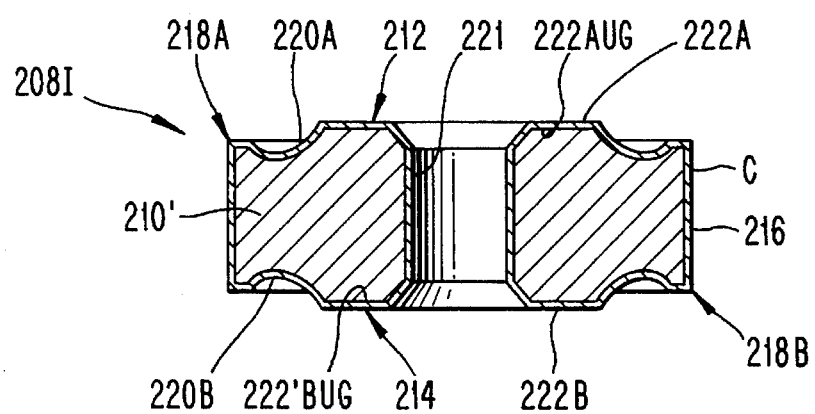
Figure 9:
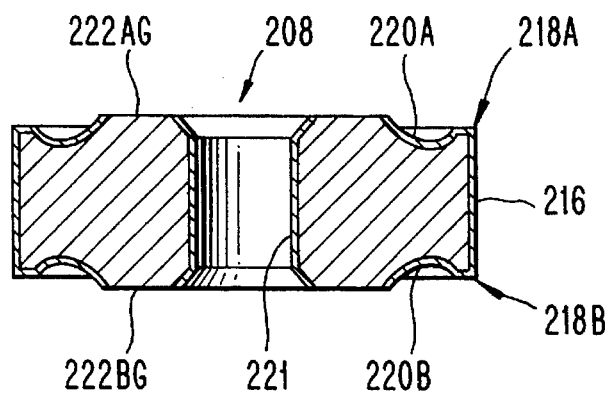

In addition to being applicable to single-sided inserts of the type disclosed in FIGS. 4–6 (i.e., wherein a cutting edge is disposed on only one of the main faces), the present invention is also applicable to a double-sided insert of the type depicted in FIG. 9, wherein cutting edges are disposed on both of the main faces. The double-sided insert 208 depicted in FIG. 9 is made by first sintering an insert body 210' (see FIG. 7) having first and second main faces 212', 214' interconnected by side faces 216'. A center hole 221' extends through the body 210'. The first main face 212' includes cutting edges 218'A chip breaking grooves 220'A and a supporting surface 222'AUG (which serves as the supporting surface for the second main face 214'). The supporting surface lies on an island disposed at the center of the insert and through which the center hole extends. The second main face 214' includes cutting edges 218'B, chip breaking grooves 220'B, and a supporting surface 222'BUG (which serves as the supporting surface for the first main face 212') formed on a central island. The supporting surfaces 222'AUG and 222'BUG remain unground.

The insert body 210' is then coated with a coating C by a vapor deposition process (e.g., CVD or PVD or a combination of both) to form an intermediate element 208I wherein the coating presents first and second main faces 212, 214 interconnected by side faces 216, and a center hole 221. The first main face 212 of the coating includes cutting edges 218A, chip breaking grooves 220A, and a supporting surface 222A. The second main face 214 of the coating presents cutting edges 218B, chip breaking grooves 220B, and a supporting surface 222B.

The intermediate element 208I is then subjected to a grinding operation wherein the supporting surfaces of both main faces are ground smooth by a conventional thickness grinding operation to form support surfaces 222AG and 222BG, with the coatings being ground off both of those supporting surfaces during the thickness grinding operation, as depicted in FIG. 9.

In use of the double-sided insert 208, the supporting surface 222BG supports the insert while the cutting edges 218A are used to cut a workpiece. When the cutting edges 218A are worn, the insert 208 can be inverted so that the cutting edges 218B are positioned for cutting while the insert is supported by the supporting surface 222AG. In each instance, the afore-described advantages relating to improved insert location and heat dissipation are achieved.

It should be noted that the method according to the present invention involves forming the supporting surface(s) by grinding subsequent to coating. Within the scope of the method aspect of the invention, however, it would be possible to perform a preliminary grinding operation on the sintered insert body prior to the coating step, whereafter a further grinding is performed to form the final supporting surface while removing the coating therefrom.

The present invention is applicable to coated inserts of all shapes and sizes including square, non-square rectangular, diamond, rhombic, round, etc. In the case of a round insert, a single round coating edge would be provided, along with a single round chip breaking groove, and a single round side face.

The coating which is applied to the insert preferably comprises $Al_2O_3$, but other coatings known to those skilled in the art could be applied as well.

The invention is applicable to metal cutting inserts which perform different types of cutting operations, such as turning, milling, end facing, etc.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A method of making a metal cutting insert comprising the steps of:
   A) forming an insert body having first and second main faces disposed opposite one another and interconnected by a side face, said first main face including a cutting edge, said second main face including a supporting surface for supporting the insert on a seating surface;
   B) coating said insert with a coating such that at least said cutting edge and said supporting surface are coated; and thereafter
   C) grinding said supporting surface smooth so as to simultaneously remove the coating therefrom, whereby the supporting surface of said insert is defined by a smoothly ground surface of said insert body.

2. A method according to claim 1 wherein step A comprises sintering said insert body from a powderous hard material.

3. A method according to claim 1, wherein step A comprises sintering said insert body from tungsten carbide.

4. A method according to claim 1 including the step of pregrinding said supporting surface prior to step B, step C constituting a post-grinding step.

5. A method according to claim 1, wherein step A includes forming said insert body with a chip breaking groove disposed along said cutting edge, step B comprising coating said chip breaking groove, and said chip breaking groove remaining coated following step C.

6. A method according to claim 1, wherein step A comprises forming a rectangularly shaped insert body which includes a plurality of cutting edges.

7. A method according to claim 6, wherein step A comprises forming a square shaped insert body.

8. A method according to claim 1, wherein only said first main face has a cutting edge.

9. A method according to claim 1, wherein said insert has a cutting edge on each of said first and second main faces, each of said first and second main faces of said insert body including a said supporting surface for supporting said insert when said cutting edge of the other main face is positioned for cutting; step B including coating both of said supporting surfaces with said coating; and step C comprising grinding both of said supporting surfaces smooth while removing said coating therefrom.

\* \* \* \* \*